(12) United States Patent
Horabin et al.

(10) Patent No.: US 11,423,713 B2
(45) Date of Patent: Aug. 23, 2022

(54) SYSTEMS AND METHODS TO DETERMINE MAINTENANCE-FOCUSED AIRCRAFT DATA RECORDING FRAME CONFIGURATIONS

(71) Applicant: Taleris Global LLP, Cheltenham (GB)

(72) Inventors: Robert William Horabin, Southampton (GB); Mark John Robbins, Eastleigh (GB); Thomas Antoine Raymond Bermudez, Southampton (GB)

(73) Assignee: TALERIS GLOBAL LLP, Cheltenham (GB)

( * ) Notice: Subject to any disclaimer, the term of this patent is extended or adjusted under 35 U.S.C. 154(b) by 677 days.

(21) Appl. No.: 16/621,951

(22) PCT Filed: Apr. 4, 2017

(86) PCT No.: PCT/EP2017/058023
§ 371 (c)(1),
(2) Date: Dec. 12, 2019

(87) PCT Pub. No.: WO2017/174600
PCT Pub. Date: Oct. 12, 2017

(65) Prior Publication Data
US 2020/0193742 A1    Jun. 18, 2020

(30) Foreign Application Priority Data

Apr. 5, 2016 (GB) .................................... 1605821

(51) Int. Cl.
*G07C 5/08* (2006.01)
*B64D 45/04* (2006.01)
(Continued)

(52) U.S. Cl.
CPC ........... *G07C 5/0808* (2013.01); *G07C 5/006* (2013.01); *B64D 45/04* (2013.01)

(58) Field of Classification Search
USPC ........................................................ 701/29.1
See application file for complete search history.

(56) References Cited

U.S. PATENT DOCUMENTS

| 4,604,711 | A | * | 8/1986 | Benn ....................... | G01C 23/00 701/14 |
| 6,115,656 | A | * | 9/2000 | Sudolsky .................. | B64F 5/60 701/3 |

(Continued)

FOREIGN PATENT DOCUMENTS

| CN | 102483865 A | 5/2012 |
| CN | 103314397 A | 9/2013 |

(Continued)

OTHER PUBLICATIONS

Chinese Search Report Corresponding to Application No. 2017800222441 dated Sep. 24, 2020.

(Continued)

*Primary Examiner* — Tyler D Paige
(74) *Attorney, Agent, or Firm* — Dority & Manning, P.A.

(57) ABSTRACT

Systems and methods for formatting aviation data for improved aircraft fault detection, diagnosis, and maintenance are provided. One example method includes determining a plurality of available parameters associated with an aircraft. The method includes matching the plurality of available parameters against a plurality of desired parameters to identify a plurality of matched parameters that are both desired and available. The plurality of matched parameters are useful to perform fault diagnosis and prognosis for the aircraft. The method includes determining a priority level for each of the plurality of matched parameters. The method includes creating a standardized maintenance-optimized data frame configuration based at least in part on the (Continued)

plurality of matched parameters and the priority level for each of the plurality of matched parameters.

16 Claims, 4 Drawing Sheets

(51) Int. Cl.
*B64F 5/60* (2017.01)
*B64D 45/00* (2006.01)
*G07C 5/00* (2006.01)

(56) References Cited

U.S. PATENT DOCUMENTS

| | | | |
|---|---|---|---|
| 6,628,995 | B1 | 9/2003 | Korson et al. |
| 8,838,326 | B2 * | 9/2014 | Gros .................. G07C 5/008 701/31.4 |
| 9,336,632 | B2 | 5/2016 | Mahalingaiah et al. |
| 10,248,742 | B2 * | 4/2019 | Desell .................. G01C 23/00 |
| 2008/0040152 | A1 * | 2/2008 | Vian .................. G06Q 50/04 705/2 |
| 2012/0191273 | A1 * | 7/2012 | Jacobs .................. G08G 5/0021 701/3 |
| 2013/0274964 | A1 * | 10/2013 | Jesse .................. G05D 1/0077 701/14 |
| 2015/0066870 | A1 | 3/2015 | Romatka et al. |
| 2015/0169662 | A1 | 6/2015 | Hills et al. |
| 2015/0205615 | A1 | 7/2015 | Cunningham et al. |
| 2015/0324501 | A1 * | 11/2015 | Desell .................. G01C 23/00 703/2 |
| 2016/0086396 | A1 * | 3/2016 | Nutaro .................. G07C 5/0808 701/29.4 |
| 2019/0389599 | A1 * | 12/2019 | Dillard .................. B64D 45/00 |
| 2020/0193742 | A1 * | 6/2020 | Horabin .................. G07C 5/0808 |

FOREIGN PATENT DOCUMENTS

| | | |
|---|---|---|
| EP | 2846276 A1 | 3/2015 |
| EP | 2991043 A1 | 3/2016 |
| JP | H08198197 A | 8/1996 |
| WO | WO2013036335 | 3/2013 |
| WO | WO2015/108850 A1 | 7/2015 |

OTHER PUBLICATIONS

International Search Report Corresponding to Application No. PCT/EP2017/058023 dated Jul. 6, 2017.
Canadian Office Action Corresponding to Application No. 3019248 dated May 29, 2020.
Search Report corresponding with GB Application GB 16028216, dated Oct. 14, 2016.
European Search Report Corresponding to PCTEP2017058023 dated Jul. 6, 2017
Canadian Office Action Corresponding to Application No. 3019248 dated Jun. 3, 2019.
Great Britain Office Action Corresponding to Application No. 1605821 dated Jul. 15, 2019.

* cited by examiner

SYSTEMS AND METHODS TO DETERMINE MAINTENANCE-FOCUSED AIRCRAFT DATA RECORDING FRAME CONFIGURATIONS

CROSS-REFERENCE TO RELATED APPLICATIONS

The present application claims the benefit of PCT Application Ser. No. PCT/EP2017/058023 filed on Apr. 4, 2017, which claims priority to Great Britain Patent Application No. 1605821.6 filed on Apr. 5, 2016, both of which are incorporated herein by reference in their entirety.

FIELD

The present subject matter relates generally to aircraft data handling, and more particularly to systems and methods to determine maintenance-focused aircraft data recording frame configurations.

BACKGROUND

Vast quantities of data related to performance tracking or health monitoring for aircraft assets are generally available. Analysis of such aircraft data can offer useful information for maintenance and prognostics for the aircraft.

For example, modern aircraft are equipped with a large number of different computers that provide a wide range of control functions and that output various data, including fault codes or other fault indications. Aircraft may also have a large number of sensors that provide data regarding various conditions associated with the aircraft, including continuous parameter data or other flight data. In addition, the aircraft may generate various fault and warning messages.

Thus, modern aircraft typically output a very large amount of flight data. For example, a bus specification of an aircraft can be around 1,400 pages in length and contain 10,000 parameters for a reasonably modern A330 aircraft type. For the latest A380/787 type aircraft, the bus specification could be 10 times or more greater than the above example for the A330 aircraft type.

One example system that collects aviation data is a quick access recorder ("QAR"). A QAR is an airborne flight data recorder designed to provide quick and easy access to raw flight data, through means such as USB, cellular, or wireless network connections and/or the use of standard flash memory cards. QARs are typically used by airlines to improve flight safety and operational efficiency, usually in the scope of their flight operational quality assurance plans. Like the aircraft's flight data recorder ("FDR"), a QAR can receive its inputs from the Flight Data Acquisition Unit ("FDAU"), and can record, for example, thousands of flight parameters. Civil airlines routinely download all data from an aircraft's QAR and use such data to identify operational risk and/or other operational objectives within the context of flight quality assurance.

Thus, the parameters recorded in a QAR data frame are traditionally selected for operational and flight safety purposes, and are a subset of all the available parameters on the aircraft data buses. As such, QAR data frames are not optimized for detecting and diagnosing faults on an aircraft or other maintenance-related objectives. In addition, QAR data frames are not standardized and vary from airline to airline, which increases the difficulty of porting analytics processing of this data to extract aircraft system health, performance, and fault diagnostic information from one airline to another.

Thus, current formattings of aviation data (e.g., current QAR data frames) are optimized for operational purposes, rather than aircraft fault detection, diagnosis, and maintenance. Therefore, systems and methods for determining maintenance-focused aircraft data frame configurations are needed.

BRIEF DESCRIPTION

Aspects and advantages of the present disclosure will be set forth in part in the following description, or may be learned from the description, or may be learned through practice of the examples disclosed herein.

One example aspect of the present disclosure is directed to a computer-implemented method to determine a standardized maintenance-optimized data frame configuration. The method includes determining, by one or more computing devices, a plurality of available parameters associated with an aircraft. The method includes matching, by the one or more computing devices, the plurality of available parameters against a plurality of desired parameters to identify a plurality of matched parameters that are both desired and available. The plurality of matched parameters are useful to perform fault diagnosis and prognosis for the aircraft. The method includes determining, by the one or more computing devices, a priority level for each of the plurality of matched parameters. The method includes creating, by the one or more computing devices, the standardized maintenance-optimized data frame configuration based at least in part on the plurality of matched parameters and the priority for the plurality of matched parameters.

Another example aspect of the present disclosure is directed to an aviation data handling system. The aviation data handling system includes a data frame configuration system. The data frame configuration system includes one or more processors and one or more non-transitory computer-readable media that store instructions that when executed by one or more processors cause the data frame configuration system to perform operations. Execution of the instructions causes the data frame configuration system to determine a plurality of available parameters associated with an aircraft. Execution of the instructions causes the data frame configuration system to match the plurality of available parameters against a plurality of desired parameters to identify a plurality of matched parameters that are both desired and available. The plurality of matched parameters are useful to perform fault diagnosis and prognosis for the aircraft. Execution of the instructions causes the data frame configuration system to determine a priority for the plurality of matched parameters. Execution of the instructions causes the data frame configuration system to create a standardized maintenance-optimized data frame configuration based at least in part on the plurality of matched parameters and the respective priority level for each of the plurality of matched parameters.

Another example aspect of the present disclosure is directed to a non-transitory computer-readable medium that stores instructions that when executed by one or more processors cause the one or more processors to perform operations. Execution of the instructions causes the one or more processors to read a set of documented information that describes a plurality of available parameters that are available on one or more data buses of an aircraft type and a plurality of available sampling rates at which the plurality of available parameters are respectively available. Execution of the instructions causes the one or more processors to identify at least one of a maximum available data recording rate and a maximum data frame size. Execution of the instructions causes the one or more processors to configure one or more prioritized lists that describe a plurality of desired parameters for the aircraft type and a plurality of desired sampling rates at which the plurality of desired parameters are respectively desired. The plurality of desired parameters are useful for detect and resolve maintenance issues with the aircraft type. Execution of the instructions causes the one or more processors to match the plurality of available parameters and the plurality of available sampling rates against the plurality of desired parameters and the plurality of desired sampling rates to identify a plurality of matched parameters. Execution of the instructions causes the one or more processors to create a data frame configuration that records the matched parameters at the desired sampling rates. The data frame configuration is based at least in part on the at least one of the maximum available data recording rate and the maximum data frame size.

Variations and modifications can be made to these example aspects of the present disclosure.

These and other features, aspects and advantages of various examples will become better understood with reference to the following description and appended claims. The accompanying drawings, which are incorporated in and constitute a part of this specification, illustrate aspects of the present disclosure and, together with the description, serve to explain the related principles.

BRIEF DESCRIPTION OF THE DRAWINGS

Detailed discussion of aspects directed to one of ordinary skill in the art are set forth in the specification, which makes reference to the appended figures, in which.

DETAILED DESCRIPTION

Figure 1:
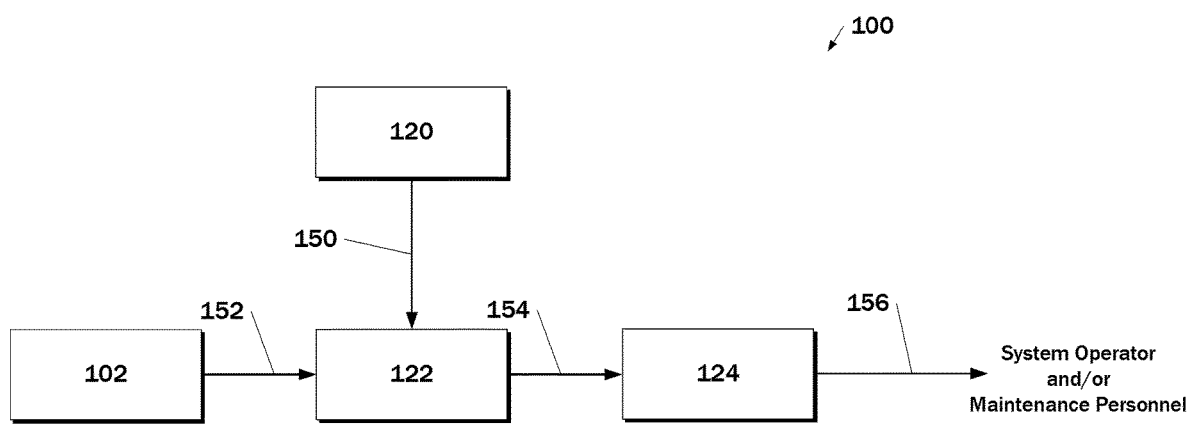
FIG. 1 depicts an overview of an example aviation data handling system according to example aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for determining aviation data recording frame configurations that are useful for maintenance purposes. In particular, a data frame configuration system of the present disclosure can design or otherwise determine a standard maintenance-optimized data frame configuration that maximizes the potential to detect, diagnose, and prognose aircraft system faults or other maintenance objectives. For example, the maintenance-optimized data frame configuration can include a standardized parameter set, sampling rates, and/or formatting. After the maintenance-optimized data frame configuration is determined, a QAR or other aircraft data recorder can format received aviation data into a data file according to the maintenance-optimized configuration. The recorded data file can be analyzed by a set of standardized analytics to provide aircraft maintenance and health information.

Thus, example aspects of the present disclosure can have a beneficial effect of determining a maintenance-optimized data frame configuration for recording aircraft data. The systems and methods of the present disclosure can eliminate the extremely large repetitive manual effort of trawling the bus specification of the aircraft to attempt to reconfigure the QAR data frame for maintenance purposes.

In particular, example aspects of the present disclosure can have a technical effect of producing a data frame specification for recording aviation data that maintains existing parameters for flight data monitoring programs and/or flight operational quality assurance programs, while introducing additional parameters for maintenance prognostic uses. The data frame can also be prioritized for subsystems (e.g., ATA Chapters) that have been identified as drivers for delays and/or other operational impacts.

Although example aspects of the present disclosure are discussed with reference to aviation data and other avionic systems associated with an aircraft for purposes of illustration and discussion, the subject matter described herein can be used with other vehicles, machines, mechanical assets, or other systems without deviating from the scope of the present disclosure.

With reference now to the Figures, example aspects of the present disclosure will be discussed in further detail.

FIG. 1 depicts an overview of an example aviation data handling system 100 according to example embodiments of the present disclosure. The aviation data handling system 100 includes a data frame configuration system 120, a data formatter 122, and an aircraft health monitoring system 124.

The data frame configuration system 120 can design or otherwise determine a standardized maintenance-optimized parameter set and/or data frame configuration 150 that maximizes the potential to detect, diagnose, and prognose aircraft system faults. The data frame configuration system 120 can provide the determined maintenance-optimized data frame configuration 150 to the data formatter 122. The data formatter 122 can format received aviation data 152 into a data file 154 that complies with or otherwise satisfies the maintenance-optimized configuration 150.

In particular, the data formatter 122 can store the data in a file formatted using the maintenance optimized data frame. This data file can then be transmitted (e.g., during or after flight) to the aircraft health monitoring system 124, which can analyze the aviation data to output maintenance information 156 such as alerts. For example, standardized analytics can be applied to the data to output the maintenance information or alerts.

In some implementations, the data frame configuration system 120 is located at a ground station and operates in an offline process to determine the maintenance-optimized data frame configuration(s) 150. On the contrary, the data formatter 122 can be included on an aircraft and can operate in real time to format data during flight. For example, the data formatter 122 can be a QAR, Flight Data Interface Management Unit ("FDIMU"), or component thereof. The aircraft health monitoring system 124 can be located on the aircraft or at a ground station. Each of the data frame configuration system 120, the data formatter 122, and the aircraft health monitoring system 124 can include one or more processors and one or more non-transitory computer-readable media that store instructions that are executable by the one or more processors.

According to an aspect of the present disclosure, in order to design or otherwise determine the maintenance-optimized data frame configuration, the data frame configuration system 120 can read or otherwise obtain all documented information on the available parameters on the aircraft data buses and their sampling rates.

As one example, the data frame configuration system 120 can receive typical or known information regarding available parameters and their sampling rates on the aircraft bus for a class or type of aircraft. For example, a bus specification that is representative of a class or type of aircraft can be imported to the data frame configuration system 120 and analyzed as a whole. As another example, the available parameters and their respective sampling rates for a class or type of aircraft can be received as manual inputs into the data frame configuration system 120.

In some implementations, where an available parameter appears on multiple buses, the data frame configuration system 120 can identify the primary source of the parameter based on a likely bus hierarchy. For example, within each different aircraft system (e.g., each ATA chapter), the data frame configuration system 120 can identify the primary component system and the bus associated with such system. Determination of the primary source of the available parameter can help avoid recording duplicates while obtaining the most reliable source.

The data frame configuration system 120 can identify a maximum available data recording rate or data frame size. For example, the maximum available data recording rate and/or the maximum data frame size can be influenced by or determined based at least in part on various system parameters and/or constraints. For example, the maximum available data recording rate and/or the maximum data frame size can be fixed and can be determined by various hardware constraints of the data formatter 122, which can be, for example, a QAR, a FDIMU, or component thereof. The maximum available data recording rate and/or the maximum data frame size can also be determined by how much an airline is prepared to pay to download the recorded data. Thus, the maximum available data recording rate and/or the maximum data frame size is typically driven by hardware and/or operational constraints associated with the system which will employ the resulting maintenance-optimized data frame configuration to record and transmit flight data.

The data frame configuration system 120 can configure prioritized lists of desired continuous and discrete parameters for aircraft maintenance operations. The prioritized list can also include a desired sampling rate for each identified parameter. In some implementations, the lists can be predetermined based on manual input, stored in memory, and then obtained from memory by the data frame configuration system 120 during operation.

More particularly, in some implementations, the data frame configuration system 120 can determine an intra-system priority for each of the desired parameters. The intra-system priority for each desired parameter can describe a priority of such desired parameters relative to other desired parameters included within a same aircraft system (e.g., within the same ATA Chapter). For example, parameters which are associated with components that are major drivers of operational problems and/or maintenance delays can be assigned a higher intra-system priority.

The data frame configuration system 120 can match available and desired parameters and sample rates. For example, the data frame configuration system 120 can compare the available parameters for a class or type of aircraft with the desired parameters described by the prioritized lists and identify which of the desired parameters are available. The data frame configuration system 120 can also compare the sampling rates of the available parameters with desired sampling rates. In some implementations, only those available parameters which are matched with a desired parameter will be included within the data frame configuration. Thus, in such implementations, if an available parameter is not a desired parameter, it will not be included in the data frame configuration. Parameters that are both available and desired can be referred to as matched parameters. Further, in some implementations, parameters are only considered matched if the available sampling rate is greater than or equal to the desired sampling rate, and the parameter can therefore be recorded at the desired sampling rate. However, for a typical parameter, the available sampling rate on the data bus is generally much higher than the desired sampling rate.

According to another aspect of the present disclosure, the data frame configuration system 120 can configure a set of value weightings for a plurality of fault detection capabilities. Each fault detection capability can be associated with one or more parameters that are useful to perform such capability. The value weightings can be assigned with regards to the aircraft as a whole.

In some implementations, the value weighting for each fault detection capability can be based on an historical analysis of aircraft disruptions, delays, cancellations, etc. For example, capabilities for detecting faults that more frequently cause disruptions can be assigned a higher value weighting or otherwise given more significance.

In some implementations, value weightings can be based at least in part on different priorities between aircraft systems or potentially even among subsystems. Thus, the value weightings can describe a relative significance for recording between different fault detection capabilities and/or their associated aircraft systems.

In some implementations, the data frame configuration system 120 can assign value weightings to a fault detection capability based at least in part on whether the parameters needed to perform such capability are available. For example, a particular fault detection capability may require a certain set of parameters. Given the available parameters for the aircraft, if the particular fault detection capability cannot be performed, then such fault detection capability can be assigned a value weighting of zero. Thus, the value weightings can be based on the available parameters or other aircraft-specific factors, as well.

In some implementations, the value weightings can be varied not only based on aircraft class or type, but also based on aircraft operational conditions. For example, the value weightings for the fault detection capabilities can be varied for an aircraft that is expected to operate in hot and dry conditions, such as are experienced, for example, by an aircraft operating out of the Middle East region of the world.

According to another aspect of the present disclosure, the data frame configuration system 120 can determine a priority level for each of the matched parameters. For example, the priority level for each matched parameter can be determined based on the intra-system priority associated with such parameter and the value weighting associated with the fault detection capabilit(ies) with which such parameter is associated, if any.

The priority levels for the matched parameters can be established across all systems (e.g., globally for the entire aircraft). In particular, in some implementations, these priority levels cannot be set at a system level only because within each system there may be different types of faults, the detection of which would be given different value weightings.

As an example, the data frame configuration system 120 can input the value weighting and the intra-system priority associated with each parameter into a formula to determine an output score for each parameter. The priority level for each matched parameter can be based at least in part on the output score for such parameter. For example, the matched parameters can be ranked into priority levels based on their output scores. In one example implementation, the matched parameters are ranked into at least three priority levels.

According to another aspect of the present disclosure, the data frame configuration system 120 can create a standardized data frame configuration that fills the available recording space with an optimized set of continuous and discrete parameters recorded at optimized sample rates. In particular, as an example, the standardized data frame configuration can fill the maximum data frame size with the matched parameters recorded at the desired sampling rates. The data frame configuration can include a template or specification for formatting incoming aviation data into a set of formatted frames.

In some implementations, the data frame configuration system 120 can create a standardized data frame configuration based at least in part on the priority levels associated with the matched parameters. As an example, to create the data frame configuration, the system 120 can insert the matched parameters of the first priority level into the data frame configuration. After inserting the matched parameters of the first priority level into the data frame configuration, the system can fill any remaining space in the data frame configuration with the matched parameters of the second priority level. If any space remains after the second priority level, parameters of a third priority level can be inserted, and so forth.

Other techniques for determining the data frame configuration can be used, as well. For example, in some implementations, manual input can be used to provide a final review or to instruct the data frame configuration system 120 when a choice is required between two parameters and only space for one parameter remains within the data frame configuration.

In some implementations, the data frame configuration system 120 can determine data frame configurations that maintain existing parameters for flight data monitoring programs and/or flight operational quality assurance programs, while introducing additional parameters for maintenance prognostic uses.

As an example, prior to determining the priority level for each matched parameter, the data frame configuration system 120 can identify one or more of the plurality of matched parameters as mandatory operational parameters that are required to be recorded for operational quality assurance and then remove the one or more mandatory operational parameters from the plurality of matched parameters. The priority level can then be determined for each of the remaining matched parameters. When the data frame configuration is created, the mandatory operational parameters are inserted into the data frame prior to filling with any of the remaining matched parameters. As another example, the mandatory operational parameters may simply be automatically assigned to the highest priority level.

The data frame configuration system 120 can transmit, provide, or otherwise communicate the new standardized data frame configuration 150 to the data formatter 122 for use in formatting incoming aviation data 152 according to the standardized data frame configuration. In some implementations, the data frame configuration system 120 can determine a respective standardized data frame configuration 150 for each of a plurality of different types of classes of aircraft. If a particular data formatter 122 is associated with only a certain class of aircraft, then the data frame configuration system 120 can transmit, provide, or otherwise communicate only the standardized data frame configuration determined for such class of aircraft to such particular data formatter 122. Thus, a single data frame configuration system 120 can communicate or otherwise operate in conjunction with multiple different data formatters 122 respectively associated with multiple different aircraft.

The data formatter 122 can format a set of obtained aviation data 152 into a data file 154 that satisfies the standardized maintenance-optimized data frame configuration determined by the data frame configuration system 120.

More particularly, the data formatter 122 can receive or otherwise obtain aviation data 152 that is respectively output by various computers, sensors, or other components 102 of the aircraft. The aviation data 152 can respectively describe different conditions associated with the aircraft. The aviation data 152 can include fault data, continuous flight data parameters, fault warnings and messages, or any other aircraft data.

In some implementations, the aviation data 152 can be received by the data formatter 122 via a maintenance bus of the aircraft. For example, the aircraft may have an integrated modular avionics architecture in which various aircraft control and/or computer modules and/or sensors output data via one or more system buses. In some implementations, the data formatter 122 can be included within or in communication with a flight-data acquisition unit, a quick access recorder, and/or a flight data recorder of the aircraft to receive the aviation data.

The data formatter 122 can format the incoming aviation data 152 according to the standardized maintenance-optimized data frame configuration 150 provided by the data frame configuration system 120 to create a data file 154. The data file 154 can include the matched parameters recorded at the desired sample rates.

The data file 154 can then be provided to an aircraft health monitoring system 124. In some implementations, the aircraft health monitoring system 124 is ground-based. For example, the recorded data file 154 can be communicated periodically during flight or as bulk transfer after aircraft landing. In other implementations, the aircraft health monitoring system 124 can be physically located on the aircraft and, in some instances, can receive and process the data file 154 in real time.

Thereafter, the aircraft health monitoring system 124 can apply logic-based, probabilistic, automated reasoning techniques, or other analytical techniques to the recorded data file 154 to provide an automated fault diagnosis that identifies one or more root causes of the fault indications or other parameter data included within the recorded data 154. As an example, in some implementations, the aircraft health monitoring system 124 can correlate newly collected aircraft system performance, health, and fault information derived from recorded aircraft flight data 154 with existing fault data (e.g., existing fault and warning messages generated by the different aircraft systems) to provide system health monitoring and fault diagnosis.

After identifying one or more causes of the fault indications included in the recorded data 154, the aircraft health monitoring system 124 can output maintenance information 156 (e.g., one or more alerts) that describe the one or more identified causes. The maintenance information 156 can be provided (e.g., displayed or printed) to a system operator and/or maintenance personnel of the aircraft. The maintenance information 156 can indicate the cause and/or provide a task list of practical maintenance tasks to resolve the cause.

Thus, the data frame configuration system 120 of the present disclosure provides a number of benefits. In particular, the data frame configuration system 120 creates a standardized data frame that provides the best data available for maintenance analysis and operations, which is an improvement over existing QAR data frame configurations. Secondly, due to the standardized nature of the data frame configuration and associated parameter set, a standardized set of analytics can easily be applied to data received from various different operators of the same aircraft type (e.g., currently, different operators can use different data frame configurations). Therefore, where the aircraft type is the same, analytics systems and software can be ported from one operator to another, thereby eliminating the need to design a specialized maintenance analytics program for each different operator.

Figure 2:
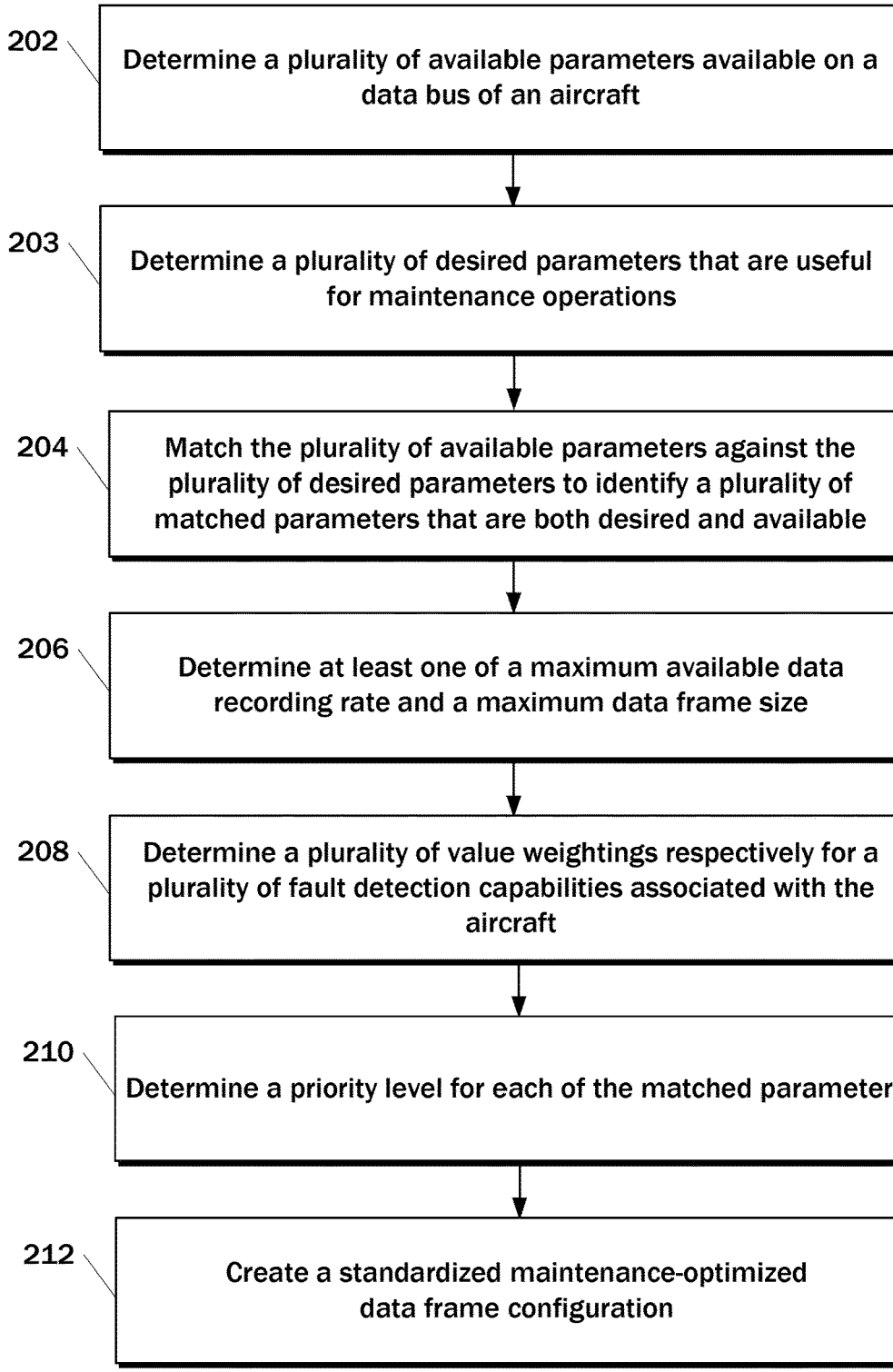
FIG. 2 depicts a flow chart diagram of an example method to determine a standardized maintenance-optimized data frame configuration according to example aspects of the present disclosure.

FIG. 2 depicts a flow chart diagram of an example method 200 to determine a standardized maintenance-optimized data frame configuration according to example embodiments of the present disclosure.

At 202, a plurality of available parameters that are available on all relevant data buses of an aircraft are determined. For example, determining the plurality of available parameters at 202 can include reading, analyzing, or obtaining a set of documented information that describes a plurality of available parameters that are available on all relevant data buses of an aircraft type.

As one example, a bus specification that is representative of a class or type of aircraft can be received at 202 and analyzed as a whole to identify the available parameters. As another example, the available parameters and their respective sampling rates for a class or type of aircraft can be received as manual inputs at 202.

In some implementations, determining the plurality of available parameters at 202 can further include determining a plurality of available sampling rates respectively associated with the plurality of available parameters. The plurality of available sampling rates can be determined in the same or similar fashion to the techniques described above for determining the available parameters.

In some implementations, determining the plurality of available parameters at 202 can further include detecting that a first parameter of the plurality of available parameters appears on a plurality of data buses; and identifying one of the plurality of data buses as a primary source of the first parameter based at least in part on a hierarchy associated with the plurality of data buses. For example, within each different aircraft system (e.g., each ATA chapter), a primary component system and bus associated with such system can be identified. Determination of the primary source of the available parameter can help avoid recording duplicates while obtaining the most reliable source.

At 203, a plurality of desired parameters that are useful for maintenance operations can be determined. The desired parameters may be associated with faults or maintenance issues that have been identified as major drivers of operational problems or maintenance delays.

In some implementations, the plurality of desired parameters can be retrieved at 203 from one or more prioritized lists that describe desired parameters for a particular aircraft or aircraft type. The prioritized list can also include a desired sampling rate for each identified parameter. In some implementations, the lists can be predetermined based on manual input, stored in memory, and then obtained from memory during operation.

In some implementations, determining the desired parameters at 203 can include determining an intra-system priority for each of the desired parameters. The intra-system priority for each desired parameter can describe a priority of such desired parameter relative to other desired parameters included within a same aircraft system (e.g., within the same ATA Chapter). For example, parameters which are associated with components that are major drivers of operational problems and/or maintenance delays can be assigned a higher intra-system priority relative to other components within the same aircraft system.

At 204, the plurality of available parameters are matched against the plurality of desired parameters to identify a plurality of matched parameters that are both desired and available. The matched parameters are useful to perform fault diagnosis and prognosis for the aircraft.

In some implementations, matching the available parameters with the desired parameters at 204 can include matching the plurality of available sampling rates of the plurality of available parameters against a plurality of desired sampling rates respectively associated with the plurality of desired parameters to identify the plurality of matched parameters. In such implementations, the plurality of matched parameters can be those parameters that are desired, available, and have available sampling rates that are greater than or equal to the desired sampling rate for such parameter.

At 206, at least one of a maximum available data recording rate and a maximum data frame size is determined. For example, the maximum available data recording rate and/or the maximum data frame size can be influenced by or determined based at least in part on various system parameters and/or constraints. For example, the maximum available data recording rate and/or the maximum data frame size can be fixed and can be determined by various hardware constraints of a data formatter that will use the data frame configuration. The maximum available data recording rate and/or the maximum data frame size can also be determined by how much an airline is prepared to pay to download the recorded data. Thus, the maximum available data recording rate and/or the maximum data frame size is typically driven by hardware and/or operational constraints associated with the system which will employ the resulting maintenance-optimized data frame configuration to record and transmit flight data.

At 208, a plurality of value weightings are respectively determined for a plurality of fault detection capabilities associated with the aircraft. Each of the plurality of fault detection capabilities can be associated with one or more of the desired parameters that are useful to perform such fault detection capability. In some implementations, the priority level or other treatment of each parameter can depend upon the value weighting for the fault detection capabilities with which such parameter is associated, if any.

In some implementations, the value weighting for each fault detection capability can be based on an historical analysis of aircraft disruptions, delays, cancellations, etc. For example, capabilities for detecting faults that more frequently cause disruptions can be assigned a higher value weighting or otherwise given more significance.

In some implementations, value weightings can be based at least in part on different priorities between aircraft systems or potentially even among subsystems. Thus, the value weightings can describe a relative significance for recording between different fault detection capabilities and/or their associated aircraft systems.

In some implementations, value weightings can be assigned to a fault detection capability at 208 based at least in part on whether the parameters needed to perform such capability are available. For example, a particular fault detection capability may require a certain set of parameters. Given the available parameters for the aircraft, if the particular fault detection capability cannot be performed, then such fault detection capability can be assigned a value weighting of zero at 208. Thus, the value weightings can be based on the available parameters or other aircraft-specific factors, as well.

In some implementations, the value weightings can be varied at 208 not only based on aircraft class or type, but also based on aircraft operational conditions. For example, the value weightings for the fault detection capabilities can be varied for an aircraft that is expected to operate in hot and dry conditions, such as are experienced, for example, by an aircraft operating out of the Middle East region of the world.

At 210, a priority level is determined for the plurality of matched parameters. For example, the priority level for each of the matched parameters can be based at least in part on the intra-system priority indicated for the desired parameters by the one or more priority lists described above. As another example, the priority level for each matched parameter can be based at least in part on the value weighting(s) for the fault detection capabilities with which such parameter is associated, if any. In other implementations, the priority level for each of the matched parameters can be based at least in part on some combination of its intra-system priority indicated by the priority lists and the value weighting(s) for its associated fault detection capabilities.

As one example, at 210, the value weighting and the intra-system priority associated with each parameter can be input into a formula to determine an output score for each parameter. The priority level for each matched parameter can be based at least in part on the output score for such parameter. For example, the matched parameters can be ranked into priority levels at 210 based on their output scores. In one example implementation, the matched parameters are ranked into at least three priority levels.

At 212, a standardized maintenance-optimized data frame configuration is created. In some implementations, the standardized maintenance-optimized data frame configuration fills an available recording space with an optimized set of matched parameters recorded at optimized sample rates.

In some implementations, the standardized maintenance-optimized data frame configuration is created at 212 based at least in part on the plurality of matched parameters, the priority levels for the plurality of matched parameters, and/or the at least one of the maximum available data recording rate and the maximum data frame size. For example, the standardized maintenance-optimized data frame configuration can adhere to the at least one of the maximum available data recording rate and the maximum data frame size. In some implementations, the standardized maintenance-optimized data frame configuration includes only matched parameters at desired sampling rates and has higher priority level parameters reported more often than lower priority parameters.

In some implementations, the standardized maintenance-optimized data frame configuration is created at 212 based at least in part on the plurality of value weightings. For example, the standardized maintenance-optimized data frame can include matched parameters that are associated with fault detection capabilities that have greater value weightings. More particularly, the standardized maintenance-optimized data frame can be created so as to give priority to matched parameters that are associated with fault detection capabilities that have greater value weightings at the expense of matched parameters that are associated with fault detection capabilities that have lesser value weightings.

In some implementations, the standardized maintenance-optimized data frame configuration is created at 212 based at least in part on the priority levels associated with the matched parameters. As an example, creating the configuration at 212 can include inserting the matched parameters of the first priority level into the data frame configuration; and, after inserting the matched parameters of the first priority level into the data frame configuration, filling any remaining space in the data frame configuration with the matched parameters of the second priority level. If any space remains after the second priority level, parameters of a third priority level can be inserted, and so forth.

Other techniques for determining the data frame configuration can be used, as well. For example, in some implementations, manual input can be used to provide a final review or to provide instructions when a choice is required between two parameters and only space for one parameter remains within the data frame configuration.

In some implementations, data frame configurations can be created at 212 that maintain existing parameters for flight data monitoring programs and/or flight operational quality assurance programs, while introducing additional parameters for maintenance prognostic uses.

As an example, determining the priority levels at 210 and/or creating the data frame configuration at 212 can include identifying one or more of the plurality of matched parameters as mandatory operational parameters that are required to be recorded for operational quality assurance; and removing the one or more mandatory operational parameters from the plurality of matched parameters.

The priority level can be determined for each of the remaining matched parameters. When the data frame configuration is created at 212, the mandatory operational parameters can be inserted into the data frame prior to filling with any of the remaining matched parameters. As another example, the mandatory operational parameters may simply be automatically assigned to the highest priority level at 210.

Figure 3:
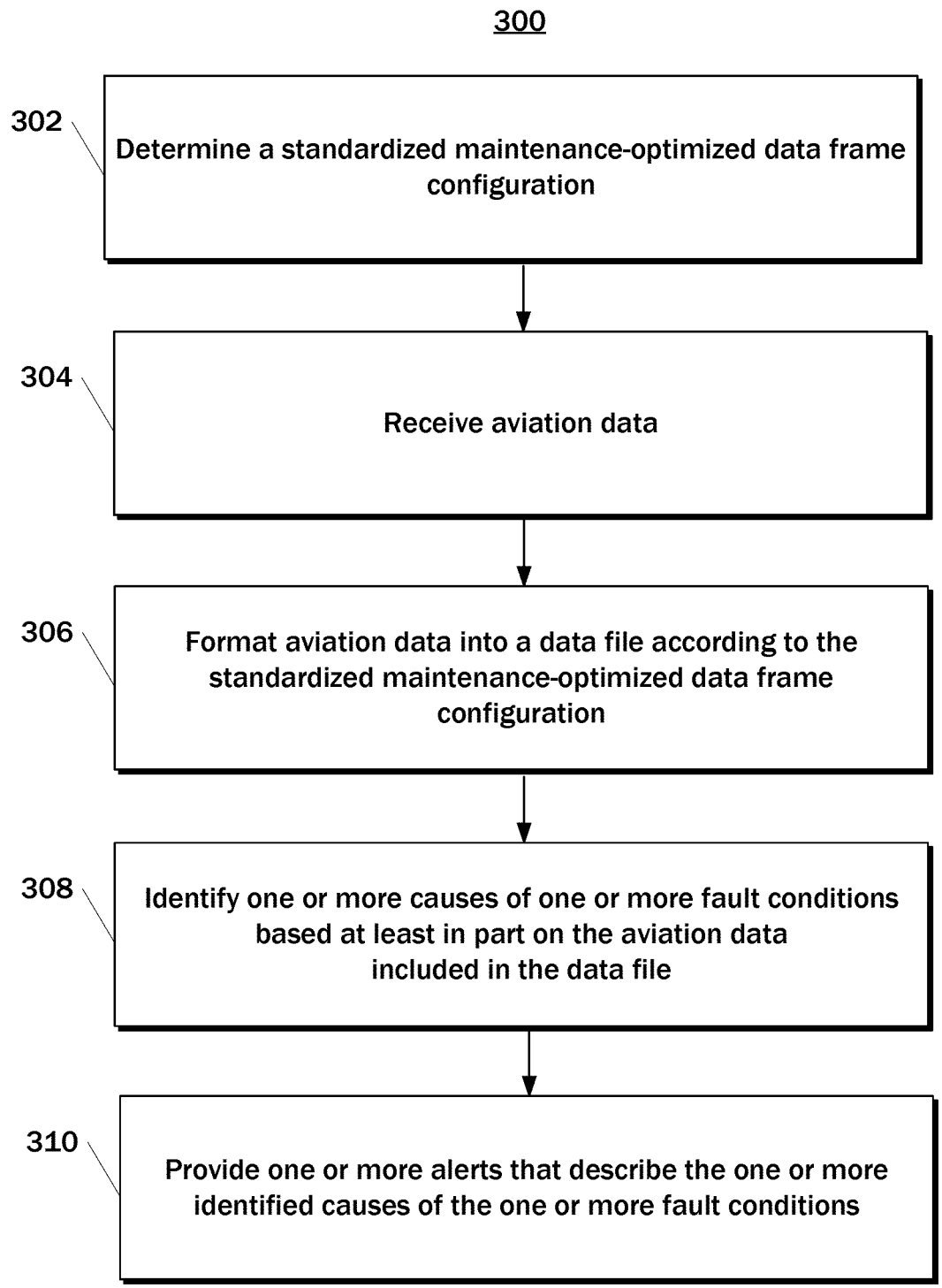
FIG. 3 depicts a flow chart diagram of an example method to format and analyze aviation data according to example aspects of the present disclosure.

FIG. 3 depicts a flow chart diagram of an example method 300 to format and analyze aviation data according to example embodiments of the present disclosure.

At 302, a standardized maintenance-optimized data frame configuration is determined. For example, the standardized maintenance-optimized data frame configuration can be determined according to method 200 of FIG. 2.

The new standardized data frame configuration can be transmitted to a data formatting component for use in formatting incoming aviation data according to the standardized data frame configuration. In some implementations, at 302, a respective standardized data frame configuration can be determined for each of a plurality of different types of classes of aircraft. If the remainder of method 300 is performed for a certain class of aircraft, then only the standardized data frame configuration determined for such class of aircraft can be provided to the data formatting component.

At 304, aviation data is received. For example, the aviation data can be received at 304 via one or more data buses of the aircraft (e.g., a maintenance data bus). For example, the aircraft may have an integrated modular avionics architecture in which various aircraft control and/or computer modules and/or sensors output data via one or more system buses. In some implementations, the aviation data can be received from a flight-data acquisition unit, a quick access recorder, and/or a flight data recorder of the aircraft.

At 306, the aviation data is formatted according to the data frame configuration determined at 302. For example, a QAR on an aircraft can use the data frame configuration determined at 302 for formatting/recording the acquired aircraft data. The QAR can output the recorded data as a data file formatted according to the defined data frame configuration.

At 308, one or more causes of one or more fault conditions are identified based at least in part on the recorded aviation data (e.g., the data file output by the QAR). In particular, the recorded aircraft data can be provided to an aircraft health monitoring system. At 308, the aircraft health monitoring system can apply logic-based, probabilistic, automated reasoning techniques, or other analytical techniques to the recorded data to provide an automated fault diagnosis that identifies one or more root causes of the fault indications or other parameter data included within the recorded data. As an example, in some implementations, the aircraft health monitoring system can correlate newly collected aircraft system performance, health, and fault information derived from aircraft flight data included in the recorded data with existing fault data (e.g., existing fault and warning messages generated by the different aircraft systems) to provide system health monitoring and fault diagnosis.

At 310, one or more alerts are provided that describe the one or more identified causes of the one or more fault conditions. The alerts can be provided (e.g., displayed or printed) to a system operator and/or maintenance personnel of the aircraft. The alerts can indicate the cause and/or provide a task list of practical maintenance tasks to resolve the cause.

Figure 4:
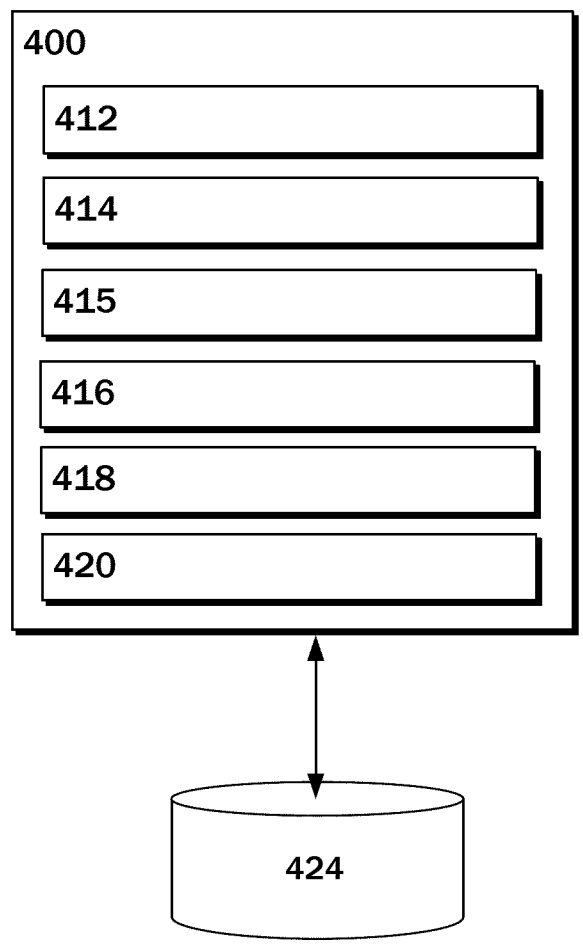
FIG. 4 depicts a block diagram of an example data frame configuration system according to example aspects of the present disclosure.

FIG. 4 depicts a block diagram of an example data frame configuration system 400 according to example embodiments of the present disclosure. The system 400 can operate to implement aspects of the present disclosure, including method 200 of FIG. 2.

The data frame configuration system 400 includes one or more processor(s) 412 and one or more memory devices 414. The one or more processor(s) 412 can include any suitable processing device, such as a microprocessor, microcontroller, integrated circuit, logic device, one or more central processing units (CPUs), and/or other processing devices. In some implementations the one or more processor(s) 412 can include at least one data frame determining processor and at least one data formatting processor.

The one or more memory devices 414 can include one or more non-transitory computer-readable media, including, but not limited to, RAM, ROM, firmware, hard drives, flash drives, or other memory devices. In some examples, memory devices 414 can correspond to coordinated databases that are split over multiple locations.

The one or more memory devices 414 store information accessible by the one or more processors 412, including instructions that can be executed by the one or more processors 412. For instance, memory device 414 or other components of the system 400 can store instructions for performing various functions disclosed herein (e.g., some or all of methods 200 and 300).

The data frame configuration system 400 can further include a parameter matcher 415, a parameter prioritizer 416, a data frame configurer 418, and a data transmitter 420. The parameter matcher 415 can match available parameters and available sampling rates with desired parameters and desired sampling rates to identify a number of matched parameters. The parameter prioritizer 416 can determine a priority level for each matched parameter based on an intra-system priority and/or a value weighting associated with each parameter. In some implementations, the prioritizer 416 can determine the value weightings as well. The data frame configurer 418 can design or otherwise determine a standardized maintenance-optimized data frame configuration based on the matched parameters and their respective priority levels. The data transmitter 420 can transmit the created data frame configuration to a data formatter such as a QAR.

Each of the parameter matcher 415, the parameter prioritizer 416, and the data frame configurer 418 include computer logic utilized to provide desired functionality. Thus, each of the parameter matcher 415, the parameter prioritizer 416, and the data frame configurer 418 can be implemented in hardware, application specific circuits, firmware and/or software controlling a general purpose processor. In one embodiment, each of the parameter matcher 415, the parameter prioritizer 416, and the data frame configurer 418 are program code files stored on a storage device, loaded into memory and executed by a processor or can be provided from computer program products, for example computer executable instructions, that are stored in a tangible computer-readable storage medium such as RAM, hard disk or optical or magnetic media. The parameter matcher 415, the parameter prioritizer 416, and the and the data frame configurer 418 can each correspond to one or more different programs, files, circuits, or sets of instructions. Likewise, two or more of the parameter matcher 415, the parameter prioritizer 416, and the data frame configurer 418 can be combined into a single program, file, circuit, or set of instructions.

The data transmitter 420 can include any components or configuration suitable for communication with other computing devices over a network, including, for example, one or more ports, transmitters, wireless cards, controllers, physical layer components, or other items for communication according to any currently known or future developed communications protocol or technology, including aircraft to ground communications technologies.

The data frame configuration system 400 can store various types of data within a database 424. Database 424 can be one database or can be multiple databases. Database 424 can be locally connected to the system 400 or can be remotely located and accessed over a network.

The technology discussed herein makes reference to processors, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single processor or device or multiple processors or devices working in combination. Databases and applications may be implemented on a single system or distributed across multiple systems. Distributed components may operate sequentially or in parallel.

The computer-executable algorithms and techniques described herein can be implemented in hardware, application specific circuits, firmware and/or software controlling a general purpose processor. In one embodiment, the algorithms or computer-implemented techniques are program code files stored on the storage device, loaded into one or more memory devices and executed by one or more processors or can be provided from computer program products, for example computer executable instructions, that are stored in a tangible computer-readable storage medium such as RAM, flash drive, hard disk, or optical or magnetic media. When software is used, any suitable programming language or platform can be used to implement the algorithm or technique.

Although specific features of various embodiments may be shown in some drawings and not in others, this is for convenience only. In accordance with the principles of the present disclosure, any feature of a drawing may be referenced and/or claimed in combination with any feature of any other drawing.

In particular, although FIGS. 2 and 3 respectively depict steps performed in a particular order for purposes of illustration and discussion, the methods of the present disclosure are not limited to the particularly illustrated order or arrangement. The various steps of the methods 200 and 300 can be omitted, rearranged, combined, and/or adapted in various ways without deviating from the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A computer-implemented method to determine a standardized maintenance-optimized data frame configuration, the method comprising:
   determining, by one or more computing devices, a plurality of available parameters that are available on one or more data buses of an aircraft;
   matching, by the one or more computing devices, the plurality of available parameters against a plurality of desired parameters to identify a plurality of matched parameters that are both desired and available, wherein the plurality of matched parameters are useful to perform fault diagnosis and prognosis for the aircraft;
   determining, by the one or more computing devices, a plurality of value weightings respectively for a plurality of fault detection capabilities associated with the aircraft, wherein each of the plurality of fault detection capabilities is associated with one or more of the desired parameters;
   determining, by the one or more computing devices, a priority level for each of the plurality of matched parameters based at least in part on the plurality of value weightings such that the standardized maintenance-optimized data frame configuration includes matched parameters that are associated with fault detection capabilities that have greater value weightings;
   creating, by the one or more computing devices, the standardized maintenance-optimized data frame configuration to include one or more matched parameters of the plurality of matched parameters based at least in part on the priority level for each of the plurality of matched parameters;
   formatting, by the one or more computing devices, a set of received aviation data into a data file according to the standardized maintenance-optimized data frame configuration;
   determining, by the one or more computing devices, maintenance information based on the data file; and
   causing, by the one or more computing devices, the maintenance information indicating a cause and/or a task of maintenance tasks to resolve the cause to be displayed or printed.

2. The computer-implemented method of claim 1, further comprising:
   determining, by the one or more computing devices, a plurality of available sampling rates respectively associated with the plurality of available parameters associated with the aircraft; and
   comparing, by the one or more computing devices, the plurality of available sampling rates of the plurality of available parameters against a plurality of desired sampling rates respectively associated with the plurality of desired parameters to identify the plurality of matched parameters, wherein the plurality of matched parameters are desired, available, and have available sampling rates that are greater than or equal to the respective desired sampling rate for such parameter.

3. The computer-implemented method of claim 1, further comprising:
   determining, by the one or more computing devices, at least one of a maximum available data recording rate and a maximum data frame size;
   wherein creating, by the one or more computing devices, the standardized maintenance-optimized data frame configuration comprises creating, by the one or more computing devices, the standardized maintenance-optimized data frame configuration that satisfies the at least one of the maximum available data recording rate and the maximum data frame size.

4. The computer-implemented method of claim 1, further comprising:
   determining, by the one or more computing devices, a plurality of intra-system priorities respectively for the plurality of desired parameters, wherein the intra-system priority for each desired parameter describes a priority of such desired parameter relative to other desired parameters included within a same aircraft system; and
   wherein determining, by the one or more computing devices, the priority level for each of the plurality of matched parameters comprises determining, by the one or more computing devices, the priority level for each of the plurality of matched parameters based at least in part on the plurality of intra-system priorities.

5. The computer-implemented method of claim 4, further comprising:
   determining, by the one or more computing devices, a plurality of value weightings respectively for a plurality of fault detection capabilities associated with the aircraft, wherein each of the plurality of fault detection capabilities is associated with one or more of the desired parameters; and wherein determining, by the one or more computing devices, the priority level for each of the plurality of matched parameters comprises determining, by the one or more computing devices, the priority level for each of the plurality of matched parameters based at least in part on the plurality of value weightings and based at least in part on the plurality of intra-system priorities.

6. The computer-implemented method of claim 5, wherein determining, by the one or more computing devices, the priority level for each of the plurality of matched parameters based at least in part on the plurality of value weightings and based at least in part on the plurality of intra-system priorities comprises inputting, by the one or more computing devices for each of the plurality of matched parameters, the value weighting associated with such parameter and the intra-system priority associated with such parameter into a formula to determine an output score for such matched parameter, wherein the priority level for each matched parameter is based at least in part on the output score for such parameter.

7. The computer-implemented method of claim 1, wherein:

determining, by the one or more computing devices, the priority level for each of the plurality of matched parameters comprises sorting, by the one or more computing devices, the plurality of matched parameters into at least a first priority level and at least a second priority level; and creating, by the one or more computing devices, the standardized maintenance-optimized data frame configuration based at least in part on the plurality of matched parameters and the priority level for each of the plurality of matched parameters comprises:

inserting, by the one or more computing devices, the matched parameters of the first priority level into the data frame configuration; and after inserting, by the one or more computing devices, the matched parameters of the first priority level into the data frame configuration, filling, by the one or more computing devices, any remaining space in the data frame configuration with the matched parameters of the second priority level.

8. The computer-implemented method of claim 1, further comprising:

detecting, by the one or more computing devices, that a first parameter of the plurality of available parameters appears on a plurality of data buses; and identifying, by the one or more computing devices, one of the plurality of data buses as a primary source of the first parameter based at least in part on a hierarchy associated with the plurality of data buses.

9. The computer-implemented method of claim 1, wherein creating, by the one or more computing devices, the standardized maintenance-optimized data frame configuration comprises creating, by the one or more computing devices, the standardized maintenance-optimized data frame configuration that fills an available recording space with an optimized set of matched parameters recorded at optimized sample rates.

10. The computer-implemented method of claim 1, wherein determining, by the one or more computing devices, the priority level for each of the plurality of matched parameters comprises:

identifying, by the one or more computing devices, one or more of the plurality of matched parameters as mandatory operational parameters that are required to be recorded for operational quality assurance;

removing, by the one or more computing devices, the one or more mandatory operational parameters from the plurality of matched parameters; and determining, by the one or more computing devices, the priority level for each of the remaining matched parameters.

11. The computer-implemented method of claim 1, further comprising:

performing, by the one or more computing devices, the computer-implemented method of claim 1 for each of a plurality of different aircraft classes, such that a respective standardized maintenance-optimized data frame configuration is created for each different aircraft class.

12. An aviation data handling system, comprising:

a data frame configuration system, the data frame configuration system comprising one or more processors and one or more non-transitory computer-readable media that store instructions that when executed by one or more processors cause the data frame configuration system to:

determine a plurality of available parameters that are available on one or more data buses of an aircraft;

match the plurality of available parameters against a plurality of desired parameters to identify a plurality of matched parameters that are both desired and available, wherein the plurality of matched parameters are useful to perform fault diagnosis and prognosis for the aircraft;

determine a plurality of value weightings respectively for a plurality of fault detection capabilities associated with the aircraft, wherein each of the plurality of fault detection capabilities is associated with one or more of the desired parameters;

determine a priority level for each of the plurality of matched parameters based at least in part on the plurality of value weightings such that the standardized maintenance-optimized data frame configuration includes matched parameters that are associated with fault detection capabilities that have greater value weightings;

create a standardized maintenance-optimized data frame configuration to include one or more matched parameters of the plurality of matched parameters based at least in part on the priority level for each of the plurality of matched parameters;

format a set of received aviation data into a data file according to the standardized maintenance-optimized data frame configuration;

determine maintenance information based on the data file; and cause the maintenance information indicating a cause and/or a task of maintenance tasks to resolve the cause to be displayed or printed.

13. The aviation data handling system of claim 12, wherein execution of the instructions further causes the data frame configuration system to:

determine a plurality of available sampling rates respectively associated with the plurality of available parameters associated with the aircraft; and compare the plurality of available sampling rates of the plurality of available parameters to a plurality of desired sampling rates respectively associated with the plurality of desired parameters to identify the plurality of matched parameters, wherein the plurality of matched parameters are desired, available, and have available sampling rates that are greater than or equal to the respective desired sampling rate for such parameter.

14. The aviation data handling system of claim 12, wherein execution of the instructions further causes the data frame configuration system to:
   determine at least one of a maximum available data recording rate and a maximum data frame size;
   wherein the data frame configuration system creates the standardized maintenance-optimized data frame configuration based at least in part on the at least one of the maximum available data recording rate and the maximum data frame size.

15. The aviation data handling system of claim 12, further comprising a quick access recorder that formats the set of received aviation data into the data file according to the standardized maintenance-optimized data frame configuration.

16. A non-transitory computer-readable medium that stores instructions that when executed by one or more processors cause the one or more processors to:
   read a set of documented information that describes a plurality of available parameters that are available on one or more data buses of an aircraft type and a plurality of available sampling rates at which the plurality of available parameters are respectively available;
   identify at least one of a maximum available data recording rate and a maximum data frame size;
   configure one or more prioritized lists that describe a plurality of desired parameters for the aircraft type and a plurality of desired sampling rates at which the plurality of desired parameters are respectively desired, wherein the plurality of desired parameters are useful to detect and resolve maintenance issues with the aircraft type;
   configure a plurality of value weightings respectively for a plurality of fault detection capabilities available for the aircraft type, wherein each of the plurality of fault detection capabilities is associated with one or more of the desired parameters;
   match the plurality of available parameters and the plurality of available sampling rates against the plurality of desired parameters and the plurality of desired sampling rates to identify a plurality of matched parameters;
   create a data frame configuration that records the matched parameters at the desired sampling rates, and wherein the data frame configuration is based at least in part on the at least one of the maximum available data recording rate and the maximum data frame size as well as the plurality of value weightings;
   format a set of received aviation data into a data file according to the standardized maintenance-optimized data frame configuration;
   determine maintenance information based on the data file; and
   cause the maintenance information indicating a cause and/or a task of maintenance tasks to resolve the cause to be displayed or printed.

\* \* \* \* \*